United States Patent
Matsumoto et al.

(10) Patent No.: US 6,740,265 B2
(45) Date of Patent: May 25, 2004

(54) METHOD AND APPARATUS FOR PEELING A LENS SHEET FROM A FORMING MOLD THEREFOR

(75) Inventors: Kazuyuki Matsumoto, Tokyo-to (JP); Takashi Kawamura, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 384 days.

(21) Appl. No.: 10/007,421

(22) Filed: Dec. 5, 2001

(65) Prior Publication Data

US 2002/0070468 A1 Jun. 13, 2002

(30) Foreign Application Priority Data

Dec. 8, 2000 (JP) ..................... P2000-373810

(51) Int. Cl.[7] ............... B29D 7/01; B29D 11/00
(52) U.S. Cl. ....................... 264/1.34; 264/2.7
(58) Field of Search ................ 264/1.34, 2.7, 264/334; 249/66.1

(56) References Cited

U.S. PATENT DOCUMENTS 5,015,524 A * 5/1991 Kobayashi et al. ......... 428/332

FOREIGN PATENT DOCUMENTS

| JP | 64086102 | 3/1989 |
| JP | 06067002 | 3/1994 |
| JP | 07148751 | 6/1995 |
| JP | 2002-182010 | * 12/2002 |

OTHER PUBLICATIONS

English Translation Abstract of JP–2002–182010.*

* cited by examiner

Primary Examiner—Michael Colaianni
Assistant Examiner—Yewebdar Tadesse
(74) Attorney, Agent, or Firm—Ladas & Parry

(57) ABSTRACT

A method for peeling a lens sheet having two pairs of opposite portions from a forming mold comprises the first to third peeling steps. The first peeling step is to pull up a pair of opposite portions of a lens sheet, which is formed on a forming mold, to peel partially the lens sheet from the forming mold. The second peeling step is to pull up the other pair of opposite portions of the lens sheet to peel partially the lens sheet from the forming mold. The third peeling step is to pull up further the two pairs of opposite portions to peel entirely the lens sheet from the forming mold.

21 Claims, 16 Drawing Sheets

← CENTER OF FRESNEL LENS

CENTER OF FRESNEL LENS →

METHOD AND APPARATUS FOR PEELING A LENS SHEET FROM A FORMING MOLD THEREFOR

BACKGROUND OF THE INVENTION

1. Field of the Invention

The present invention relates a method and an apparatus for peeling a lens sheet such as a Fresnel lens sheet from a forming mold.

2. Description of the Related Art

Japanese Laid-Open Patent Application Nos. S64-86102, H6-67002 and H7-148751 disclose a method for manufacturing various kinds of lens sheet such as Fresnel lens sheets, lenticular lens sheets or the like, which are to be used for a transmission type screen for a projection TV.

According to the manufacturing method, which is disclosed in Japanese Laid-Open Patent Application No. S64-86102, a lens sheet is manufactured by carrying out the following steps. First, ultraviolet ray curing type resin in the form of liquid is applied on the entirety of the upper surface of a forming mold to form an uncured resin layer. Then, the ultraviolet ray curing type resin in the form of liquid is applied on one side of the uncured resin layer to form an uncured resin pool. Then, a sheet-shaped substrate is placed on the uncured resin pool. The uncured resin pool and the uncured resin layer are pressed together with the substrate against the forming mold by means of a pressing roller from the above-mentioned one side of the uncured resin layer toward the other side thereof so as to obtain a laminate structure of the substrate and the ultraviolet ray curing type resin, while excluding bubbles from the ultraviolet ray curing type resin. Then, ultraviolet ray is irradiated on the ultraviolet ray curing type resin through the substrate to cure it. Then, the cured resin is peeled together with the substrate from the forming mold, thus manufacturing a lens sheet.

According to the manufacturing method, which is disclosed in Japanese Laid-Open Patent Application No. H6-67002, a lens sheet is manufactured by carrying out the following steps. First, ultraviolet ray curing type resin in the form of liquid is applied on the entirety of the upper surface of a forming mold to form an uncured resin layer. Ultraviolet ray is irradiated on the uncured resin layer to cure it. The ultraviolet ray curing type resin is further applied on one side, i.e., a pressing-starting side of the cured resin layer to form an uncured resin pool. Then, the thus applied ultraviolet curing type resin is spread through a sheet-shaped substrate into a uncured resin layer by means of a pressing roller so as to obtain a laminate structure of the substrate, the cured resin layer and the uncured resin layer, while excluding bubbles from the ultraviolet ray curing type resin. Then, the ultraviolet ray is irradiated on the uncured resin layer through the substrate to cure it. Then, the cured resin is peeled together with the substrate from the forming mold, thus manufacturing a lens sheet.

According to the manufacturing method, which is disclosed in Japanese Laid-Open Patent Application No. H7-148751, a lens sheet is manufactured by carrying out the following steps. First, ultraviolet ray curing type resin in the form of liquid is applied on the entirety of the upper surface of a forming mold to form an uncured resin layer. Solvent contained in the ultraviolet ray curing type resin is vaporized by a hot-air dryer to form a solvent-vaporized layer. Then, the ultraviolet ray curing type resin is applied on one side, i.e., a pressing-starting side of the solvent-vaporized layer to form an uncured resin pool. Then, the uncured resin pool is spread through a sheet-shaped substrate into a uncured resin layer by means of a pressing roller so as to obtain a laminate structure of the substrate, the solvent-vaporized layer and the uncured resin layer, while excluding bubbles from the ultraviolet ray curing type resin. Then, the ultraviolet ray is irradiated on the uncured resin layer through the substrate to cure it. Then, the cured resin is peeled together with the substrate from the forming mold, thus manufacturing a lens sheet.

However, the above-mentioned prior art has a problem that the lens sheet may be damaged when being peeled from the forming mold.

SUMMARY OF THE INVENTION

An object of the present invention is therefore to provide a method and an apparatus for peeling a lens sheet from a forming mold, which provide a reliable peeling of the lens sheet without causing damage.

In order to attain the aforementioned object, the method of the first aspect of the present invention for peeling a lens sheet having two pairs of opposite portions from a forming mold, comprises:

a first peeling step for pulling up a pair of opposite portions of a lens sheet, which is formed on a forming mold, to peel partially said lens sheet from said forming mold;

a second peeling step for pulling up an other pair of opposite portions of said lens sheet to peel partially said lens sheet from said forming mold; and a third peeling step for pulling up further said two pairs of opposite portions to peel entirely said lens sheet from said forming mold.

In the second aspect of the present invention, said first peeling step and said second peeling step may be conducted simultaneously.

In the third aspect of the present invention, said first peeling step and said second peeling step may be conducted at a different time.

In the fourth aspect of the present invention, said first peeling step may be conducted by pulling up said pair of opposite portions simultaneously; and said second peeling step may be conducted by pulling up said other pair of opposite portions simultaneously.

In the fifth aspect of the present invention, said first peeling step may be conducted by pulling up said pair of opposite portions simultaneously; and said second peeling step may be conducted by pulling up said other pair of opposite portions at a different time.

In the sixth aspect of the present invention, said first peeling step may be conducted by pulling up said pair of opposite portions at a different time; and said second peeling step may be conducted by pulling up said other pair of opposite portions simultaneously.

In the seventh aspect of the present invention, said first peeling step may be conducted by pulling up said pair of opposite portions at a different time; and said second peeling step may be conducted by pulling up said other pair of opposite portions at a different time.

According to the above-mentioned features of the first to seventh aspects of the present invention, it is possible to peel smoothly the lens sheet from the forming mold, while preventing irregularities formed on the lens sheet from being coming into frictional contact with or being caught by irregularities of lens formation grooves of the forming mold. Defects or damage of the lens sheet can be prevented.

In the eighth aspect of the present invention, the method thereof may further comprise a holding step for holding a central portion of said lens sheet on said forming mold, prior to said first peeling step. According to such a feature, it is possible to peel the lens sheet from its periphery toward its central portion, thus preventing the peeling action starting from a certain peripheral position from extending through the central portion of the lens sheet to the opposite side. As a result, it is possible to reliably prevent the irregularities formed on the lens sheet from being coming into frictional contact with or being caught by the irregularities of the lens formation grooves of the forming mold.

In the ninth aspect of the present invention, said pair of opposite portions may be a pair of opposite diagonal edge portions of said lens sheet and said other pair of opposite portions may be the other pair of opposite diagonal edge portions thereof. According to such features, it is possible to catch the lens sheet to pull it up, thus performing an easy peeling operation of the lens sheet.

In the tenth aspect of the present invention, said pair of opposite portions may be a pair of opposite side portions of said lens sheet and said other pair of opposite portions may be the other pair of opposite side portions thereof. According to such features, it is possible to prevent deformation of the lens sheet when peeling it from the forming mold.

In the eleventh aspect of the present invention, said first peeling step may comprise a plurality of first sequential sub-steps for pulling up said pair of opposite portions by a first prescribed pulling stroke; said second peeling step may comprise a plurality of second sequential sub-steps for pulling up said other pair of opposite portions by a second prescribed pulling stroke; and said first peeling step and said second peeling step may be conducted alternately. According to such features, it is possible to peel the lens sheet from the forming mold in an appropriate manner even when the lens sheet has a large size.

In the twelfth aspect of the present invention, said first prescribed pulling stroke may increase according as number of said first sequential sub-steps increases; and said second prescribed pulling stroke may increase according as number of said second sequential sub-steps increases. According to such features, the lens sheet is peeled gradually from the forming mold. It is therefore possible to prevent an excessively large force from being applied to the lens sheet when peeling the lens sheet, thus avoiding occurrence of defect or damage of the lens sheet.

In order to attain the aforementioned object, the apparatus of the thirteenth aspect of the present invention for peeling a lens sheet having two pairs of opposite portions from a forming mold, comprises:

a first lifting device for pulling up a pair of opposite portions of a lens sheet, which is to be formed on a forming mold;

a second lifting device for pulling up an other pair of opposite portions of said lens sheet; and a control device for controlling said first and second lifting devices on a basis of any one of (i) a first operation mode that the pulling up of said pair of opposite portions of said lens sheet by said first lifting device and the pulling up of said other pair of opposite portions thereof by said second lifting device are conducted simultaneously to peel partially said lens sheet from said forming mold, and then both of said pair of opposite portions of said lens sheet and said other pair of opposite portions thereof are further pulled up by means of said first and second lifting devices to peel entirely said lens sheet from said forming mold, and (ii) a second operation mode that the pulling up of said pair of opposite portions of said lens sheet by said first lifting device and the pulling up of said other pair of opposite portions thereof by said second lifting device are conducted at a different time to peel partially said lens sheet from said forming mold, and then both of said pair of opposite portions of said lens sheet and said other pair of opposite portions thereof are further pulled up by means of said first and second lifting devices to peel entirely said lens sheet from said forming mold.

According to the above-mentioned features of the thirteenth aspect of the present invention, it is possible to peel automatically the lens sheet from the forming mold, while preventing occurrence of defects or damage of the lens sheet.

In the fourteenth aspect of the present invention, the apparatus may further comprise a holding device for holding a central portion of said lens sheet on said forming mold. According to such a feature, the holding device holds the central portion of the lens sheet on the forming mold. It is therefore possible to peel the lens sheet from its periphery toward its central portion, thus preventing the peeling action starting from a certain peripheral position from extending through the central portion of the lens sheet to the opposite side. As a result, it is possible to reliably prevent the irregularities formed on the lens sheet from being coming into frictional contact with or being caught by the irregularities of the lens formation grooves of the forming mold.

In the fifteenth aspect of the present invention, said first and second lifting devices may comprise a plurality of suction cups. According to such a feature, it is possible to catch the lens sheet to pull it up without causing occurrence of defects or damage of the lens sheet.

In the sixteenth aspect of the present invention, said first and second lifting devices may comprise a plurality of clamping members. According to such a feature, it is possible to catch firmly the lens sheet to pull it up.

In the seventeenth aspect of the present invention, said control device may control said first and second lifting devices so that a plurality of first sequential sub-steps for pulling up said pair of opposite portions by a first prescribed pulling stroke are conducted by said first lifting device, a plurality of second sequential sub-steps for pulling up said other pair of opposite portions by a second prescribed pulling stroke are conducted by said second lifting device, and said plurality of first sequential sub-steps and said plurality of second sequential sub-steps are conducted alternately. According to such features, it is possible to peel the lens sheet from the forming mold in an appropriate manner even when the lens sheet has a large size.

In the eighteenth aspect of the present invention, said control device may control said first and second lifting devices so that said first prescribed pulling stroke increases according as number of said first sequential sub-steps increases; and said second prescribed pulling stroke increases according as number of said second sequential sub-steps increases. According to such features, the lens sheet is peeled gradually from the forming mold. It is therefore possible to prevent an excessively large force from being applied to the lens when peeling the lens sheet, thus avoiding occurrence of defect or damage of the lens sheet.

The present invention includes possible combination of the above-described features of the aspects of the present invention. In the present invention, the "forming mold" means a device for forming or molding a lens sheet and includes a forming die.

DETAILED DESCRIPTION OF THE PREFERRED EMBODIMENTS

Figure 1A:
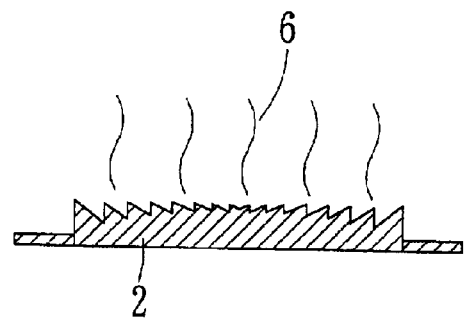
FIGS. 1(A) to 1(G) are descriptive views illustrating a lens sheet manufacturing method, to which the method of the first embodiment of the present invention for peeling a lens sheet is applied.
Figure 1B:
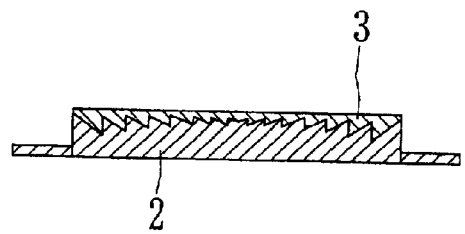
Figure 1C:
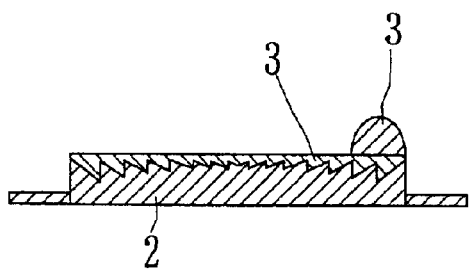
Figure 1D:
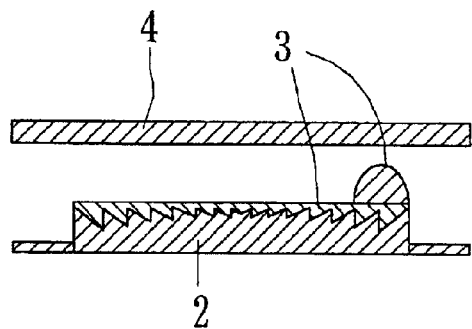
Figure 1E:
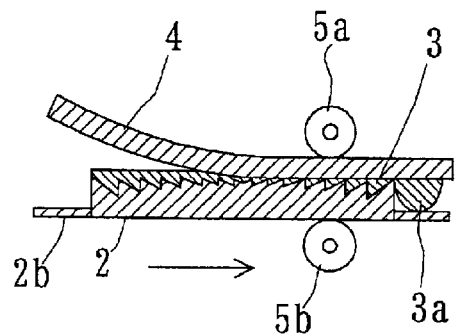
Figure 1F:
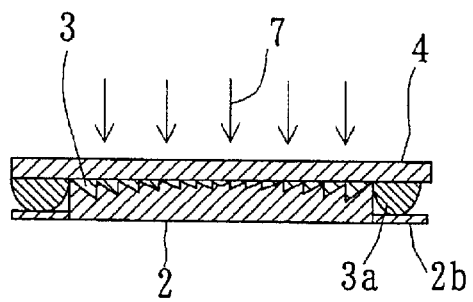
Figure 1G:
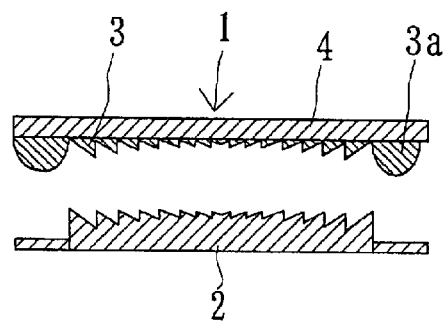

Now, embodiments of the present invention will be described in detail below with reference to the accompanying drawings.

<First Embodiment>

A lens sheet is manufactured in accordance with a manufacturing method as shown in FIGS. 1(A) to 1(G). The lens sheet 1 is a Fresnel lens sheet. The method of the present invention may be applied not only to the manufacture of the Fresnel lens sheet, but also to the manufacture of a lenticular lens sheet or the like.

As shown in FIGS. 1(A) to 1(G), the lens sheet 1 is manufactured by carrying out a temperature adjusting step (A) for make adjustment of temperature of a forming mold 2 for the lens sheet 1 to a prescribed temperature, which is suitable to formation of the lens sheet 1; the first resin-application step (i.e., the full-surface application step) (B) for applying ionizing radiation curing type resin 3 in the form of liquid on the entirety of the upper surface of the forming mold 2, to which the above-mentioned temperature adjusting step (A) has been applied, to form the first uncured resin layer; the second resin-application step (i.e., the partial-surface application step) (C) for applying the ionizing radiation curing type resin 3 in the form of liquid on one side, i.e., a pressing-starting side of the first uncured layer, which has been applied on the forming mold 2, to form an uncured resin pool; a substrate supplying step (D) for putting a substrate 4, through which ionizing radiation permeates, on the first uncured resin layer and the uncured resin pool from above the forming die 2; a laminating step (E) for pressing the substrate 4 and the forming mold 2 from the pressing-starting side toward the pressing-finishing side by means of a pair of pressing rollers 5a, 5b to spread the uncured resin pool over the first uncured resin layer and flatten it so that an superfluous amount of resin 3 reaches the periphery of a mold body of the forming mold 2, thereby forming the second uncured resin layer on the first uncured resin layer so as to provide a laminate structure of the first and second uncured resin layers and the substrate 4; a resin-curing step (F) for irradiating ionizing radiation onto the first and second uncured resin layers through the substrate 4 to cure them; and a removing step (G) for removing (i.e., a peeling step for peeling) the ionizing radiation curing type resin 3 as cured from the forming mold 2 together with the substrate 4.

Figure 3:
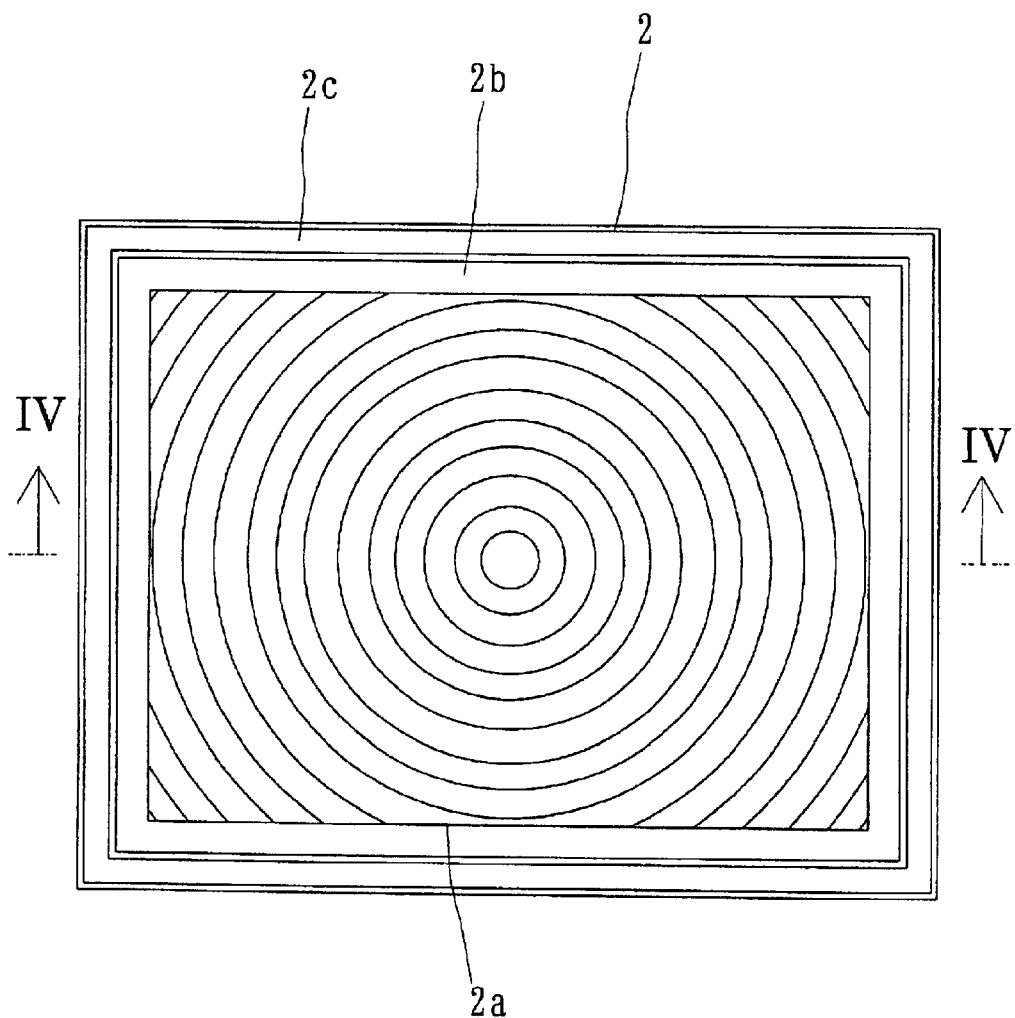
FIG. 3 is a plan view of a forming mold.
Figure 4:
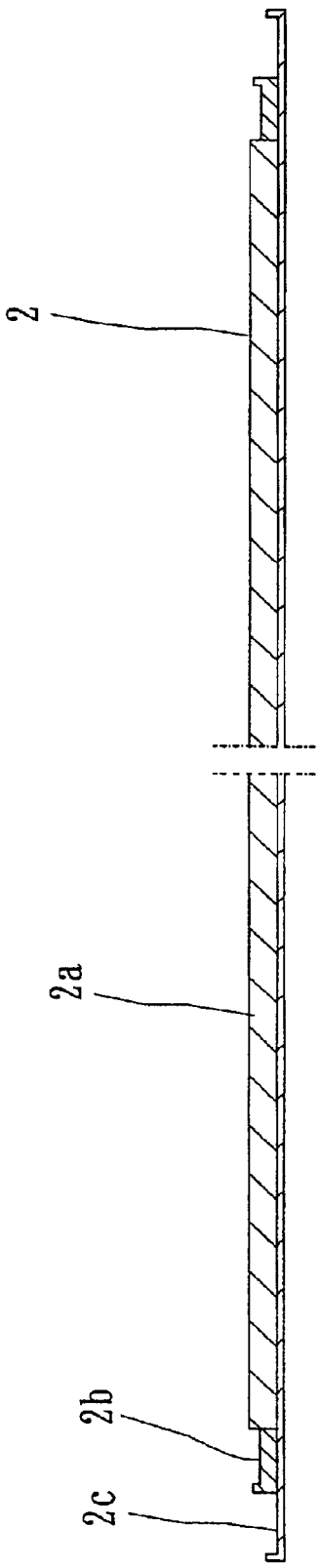
FIG. 4 is a cross-sectional view cut along the line IV—IV in FIG. 3.

The forming mold 2 used in the lens sheet manufacturing method has a mold body 2a, a receiving member 2b surrounding the periphery of the mold body 2a and a base plate 2c having a disc-shape so as to surround the receiving member 2b, as shown in FIGS. 3 and 4. The receiving member 2b and the base plate 2c may be omitted, as an occasion demands. The mold body 2a, which is a metallic mold formed by for example an electroforming method, has on its upper surface a lens formation surface on which ionizing radiation curing type resin is to be applied. A cutting mold, an electroforming mold, a resin mold or the like may be used as the mold body 2a. The receiving member 2b, which projects outside from the four peripheral sides of the mold body 2a, receives the superfluous amount of ionizing radiation curing type resin 3a overflowed from the mold body 2. The base plate 2c supports the mold body 2a and the receiving member from below thereof, thus imparting rigidity to the mold body 2 and the receiving member 2b.

The temperature-adjusting step (A) is to heat uniformly the forming mold 2 to a temperature, which is suitable to formation of the lens sheet. The step (A) is carried out for example by blowing hot air 6 heated by an electric heater, dried vapor or the like on the forming mold 2 in a prescribed period of time. The blowing step of the hot air 6 may be applied uniformly to the entirety of the forming mold 2, or in a manner that a flow rate of the hot air 6 is increased for a local portion, which is apt to be cooled. The flow rate of the hot air 6 can be adjusted by changing opening areas of a plurality of nozzles, while blowing the hot air 6 from these nozzles, or regulating an opening of a damper, which is provided on the upstream side of the nozzle. The temperature adjustment of the forming mold 2 can also be made with the use of a temperature adjustment device disposed on the forming mold 2.

In case where the ionizing radiation curing type resin 3 applied in accordance with the first resin-application step (B) and the second resin-application step (C) contains solvent, the above-described temperature-adjusting step (A) has functions not only of heating the forming mold 2, but also of removing the solvent. Removal of the solvent from the ionizing radiation curing type resin 3 prevents bubbles from being entrapped in the lens. The forming mold 2 may be heated excessively by ionizing radiation 7, which is irradiated in accordance with the resin-curing step (F). In such a case, the temperature adjusting step (A) makes it possible to cool the forming mold 7 excessively heated to an optimum temperature.

The first resin-application step (i.e., the full-surface application step) (B) is to apply the ionizing radiation curing type resin 3 in the form of liquid on the entirety of the upper surface of the forming mold 2, to which the temperature-adjusting step (A) has been applied, to form the first uncured layer. In such a step (B), the ionizing radiation curing type resin 3 is poured in the form of liquid on the forming mold 2 for example through a single nozzle or a plurality of nozzles. Application of the ionizing radiation curing type resin 3 in the form of liquid is conducted, while one or both of the forming mold 2 and the nozzle is traveled. It is preferable to apply the ionizing radiation curing type liquid resin 3 on the forming mold 2 from one side thereof to the other side thereof, while pouring the resin 3 in the form of threads from a plurality of nozzles each having a small discharging opening. This makes it possible to prevent air from being entrapped into lens formation grooves on a lens formation surface of the forming mold 2. The forming mold 2 has also been subjected to the temperature adjustment step to be heated uniformly. Accordingly, the ionizing radiation curing type liquid resin as applied rapidly extends over the lens formation grooves without entrapping bubbles.

Ultraviolet ray curing type resin, electron beam curing type resin or the like may be used as the ionizing radiation curing type liquid resin 3.

The second resin-application step (i.e., the partial-surface application step) (C) is to apply the ionizing radiation curing type liquid resin 3 on one side, i.e., the pressing-starting side of the first uncured layer, which has been applied on the forming mold 2, to from an uncured resin pool on the pressing-starting side. The ionizing radiation curing type liquid resin is poured on the forming mold 2 through the same single nozzle or plurality of nozzles as in the first resin-application step (B) or an ordinary single nozzle to form the uncured resin pool. The second resin-application step (C) may be omitted, as an occasion demands.

The substrate supplying step (D) is to place a substrate 4 on the first uncured resin layer and the uncured resin pool of the ionizing radiation curing type resin 3 from above the forming mold 2. For example, a plurality of suction cups disposed on a plane suck the substrate 4 having a sheet-shape and are moved to carry the substrate 4 on the forming mold 2 on which the first uncured resin layer and the uncured resin pool of the ionizing radiation curing type resin 3 have been formed. The sucking action of the suction cups is released so that the substrate 4 drops on the first uncured resin layer and the uncured resin pool of the ionizing radiation curing type resin 3, thus adhering on the surface of the ionizing radiation curing type resin 3.

The substrate 4 is formed of a transparent thin sheet such as an acrylic resin sheet through which ionizing radiation such as ultraviolet ray or electron beam permeates.

The laminating step (E) is to press the substrate 4 against the first uncured resin layer and the uncured resin pool of the ionizing radiation curing type resin 3 on the forming mold 2 from the pressing-starting side toward the pressing-finishing side. More specifically, the forming mold 2 on which the first uncured resin layer and the uncured resin pool of the ionizing radiation curing type resin 3 have been formed and then the substrate 4 has been placed thereon, is passed between a pair of pressing rollers 5a, 5b to spread the uncured resin pool over the first uncured resin layer, so as to form the second uncured resin layer on the first uncured resin layer. As a result, the first uncured resin layer and the second uncured resin layer are combined into a united layer having a uniform thickness. The uncured resin pool of the ionizing radiation curing type resin 3 applied in accordance with the second resin-application step (C) is spread over the first uncured resin layer from the pressing-starting side toward the pressing-finishing side so as to press bubbles out of the ionizing radiation curing type resin 3, thus preventing bubbles from being entrapped between the substrate 4 and the forming mold 2. Part of the ionizing radiation curing type resin 3 including bubbles is pushed away from the periphery of the mold body 2a. Of the pair of pressing rollers 5a, 5b, the upper roller 5a, which comes into contact with the substrate 4, is provided with a crown. Such a crown causes the ionizing radiation curing type resin 3 to flow smoothly into the lens formation grooves, which are formed concentrically, without entrapping bubbles in these grooves. In addition, the forming mold 2 is previously subjected to the temperature adjustment in the laminating step (E). As a result, the ionizing radiation curing type resin 3 flows smoothly on the forming mold 2, which is heated to an appropriate temperature, and comes securely in close contact with the substrate 4.

The resin-curing step (F) is to irradiate ionizing radiation onto the first and second uncured resin layers through the substrate 4 to cure them. More specifically, a radiation source such as an ultraviolet ray lamp is disposed above the forming mold 2 to irradiate uniformly ionizing radiation 7 on the substrate 4. The ionizing radiation 7, which permeates through the substrate 4, acts on the ionizing radiation curing type resin 3 applied on the forming mold to cure it. The ionizing radiation curing type resin 3 as cured adheres firmly to the substrate 4.

Figure 8A:
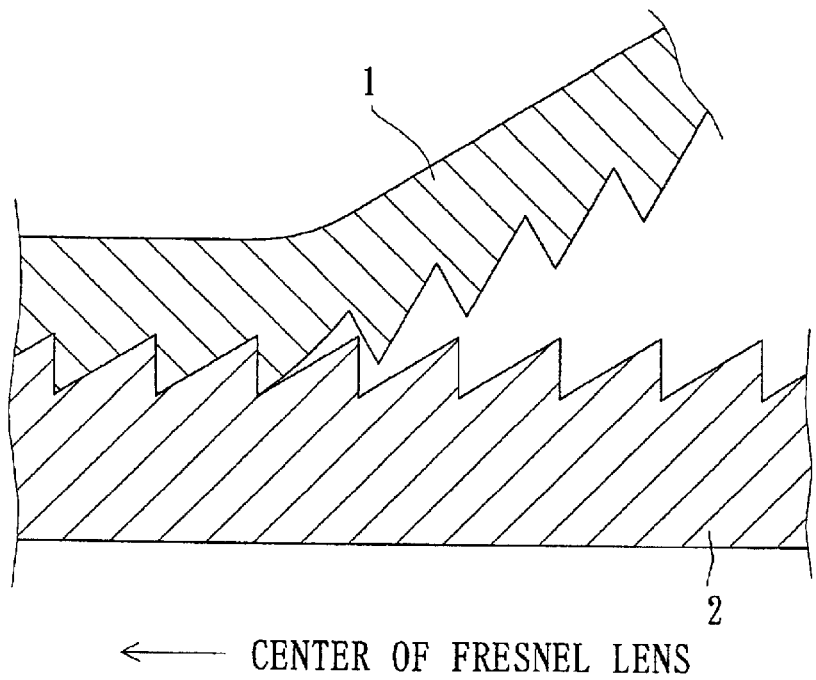
FIG. 8(A) is a schematic descriptive view illustrating a state in which the lens sheet is peeled from the forming mold in an appropriate manner.
Figure 8B:
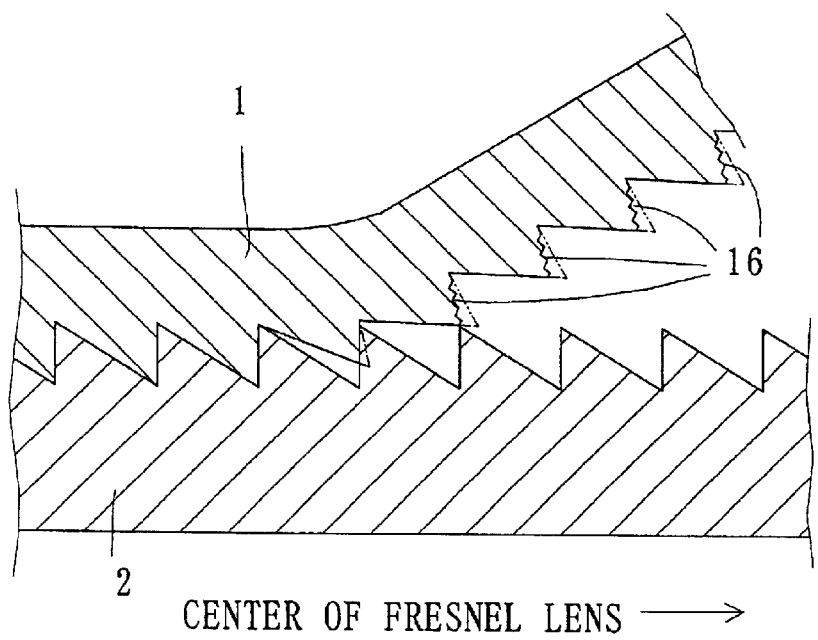
FIG. 8(B) is a schematic descriptive view illustrating a state in which defects or damage occurs when peeling the lens sheet from the forming mold.

The removing step (G) corresponds to the method of the present invention for peeling the ionizing radiation curing type resin 3 as cured thorough irradiation of the ionizing radiation 7 from the forming mold 2 together with the substrate 4. The peeling direction in the method of the present invention is determined on the basis of findings, which were obtained by the present inventors. More specifically, sharp irregularities exist on the bottom of the lens formation grooves on the Fresnel lens formation surface of the forming mold 2, as shown in FIGS. 8(A) and 8(B). When operations of catching one side or corner of the substrate and peeling it toward the other side or corner are carried out, the peeling action extends beyond the center of the Fresnel lens to the opposite side. As a result, the irregularities of the Fresnel lens formed of the ionizing radiation curing type resin 3 are caught by the lens formation grooves of the forming mold 2 as shown in FIG. 8(B), to cause occurrence of defects, thus degrading performance of the lens. A reference numeral "16" denotes damaged portions of the lens. It is therefore necessary to carry out the operation for peeling the lens sheet 1 from the forming mold 2 in a direction from the periphery of the lens sheet to the center thereof.

The removing step (G), i.e., the peeling method of the present invention is carried out on the basis of the findings of the present inventors as follows.

Figure 5:
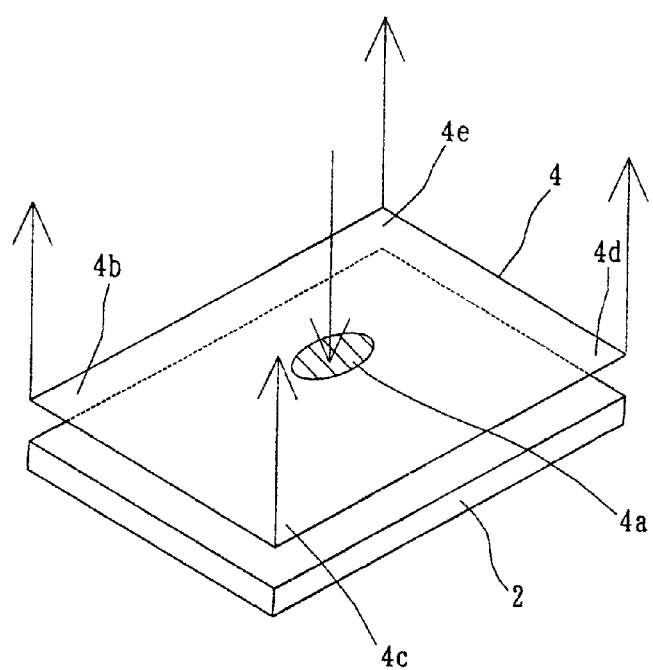
FIG. 5 is a perspective view illustrating a method for peeling the lens sheet from the forming mold.

First, the central portion 4a of the lens sheet 1 is pressed against the forming mold 2 as shown in FIG. 5 by means of a pressing device. The first peeling step is carried out. More specifically, a pair of opposite diagonal edge portions 4b, 4d are caught and pulled up simultaneously. The pair of opposite diagonal edge portions 4b, 4d may be pulled up at a different time. The first peeling step causes the lens sheet 1 formed of the ionizing radiation curing type resin 3 to be peeled partially from the opposite diagonal edge portions 4b, 4d toward the center of the lens sheet 1. Then, the pair of opposite diagonal edge portions 4b, 4d of the lens sheet 1 are moved down on the forming mold 2.

Then, the second peeling step is carried out. More specifically, another pair of opposite diagonal edge portions 4c, 4e are caught and pulled up simultaneously. The other pair of opposite diagonal edge portions 4c, 4e may be pulled up at a different time. The second peeling step causes the lens sheet 1 formed of the ionizing radiation curing type resin 3 to be peeled partially from the opposite diagonal edge portions 4c, 4e toward the center of the lens sheet 1.

Then, the third peeling step is carried out. More specifically, the two pairs of opposite diagonal edge portions 4b, 4c, 4d, 4e are pulled up simultaneously together with the pressing device, which imparts a pressing force to the central portion 3a of the lens sheet 1, to peel entirely the lens sheet 1 formed of the ionizing radiation curing type resin 3 from the forming mold 2.

When the lens sheet 1 has a large size, the first peeling step comprises a plurality of sequential sub-steps for pulling up the pair of opposite diagonal edge portions 4b, 4d by the first prescribed pulling stroke and the second peeling step also comprises a plurality of sequential sub-steps for pulling up the other pair of opposite diagonal edge portions 4c, 4e by the second pulling stroke. In such a case, the first peeling step and the second peeling step are conducted alternately. Such specific peeling steps makes it possible to cause the peeling action to extend gradually from the periphery of the lens sheet 1 toward the central portion thereof, thus providing a smooth peeling operation of the lens sheet 1 from the forming mold 2.

Alternatively, the peeling method of the present invention may be carried as follows.

Figure 6:
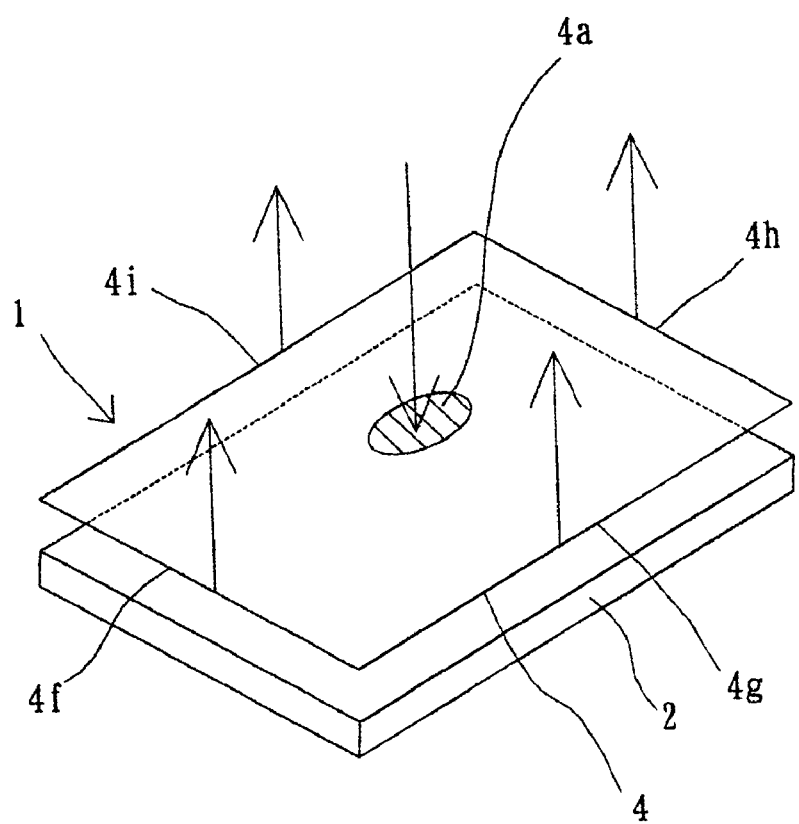
FIG. 6 is a perspective view illustrating another method for peeling the lens sheet from the forming mold.

First, the central portion 4a of the lens sheet 1 is pressed against the forming mold 2 as shown in FIG. 6 by means of a pressing device, as an occasion demands. The first peeling step is carried out. More specifically, a pair of opposite side portions 4f, 4h are caught and pulled up simultaneously. The pair of opposite side portions 4f, 4h may be pulled up at a different time. The first peeling step causes the lens sheet 1 formed of the ionizing radiation curing type resin 3 to be peeled partially from the opposite side portions 4f, 4h toward the center of the lens sheet 1. Then, the pair of opposite side portions 4f, 4h of the lens sheet 1 are moved down on the forming mold 2.

Then, the second peeling step is carried out. More specifically, another pair of opposite side portions 4g, 4i are caught and pulled up simultaneously. The other pair of opposite side portions 4g, 4i may be pulled up at a different time. The second peeling step causes the lens sheet 1 formed of the ionizing radiation curing type resin 3 to be peeled partially from the opposite side portions 4g, 4i toward the center of the lens sheet 1.

Then, the third peeling step is carried out. More specifically, the two pairs of opposite side portions 4f, 4h, 4g, 4i are pulled up simultaneously together with the pressing device, which imparts a pressing force to the central portion 3a of the lens sheet 1, to peel entirely the lens sheet 1 formed of the ionizing radiation curing type resin 3 from the forming mold 2.

When the lens sheet 1 has a large size, the first peeling step comprises a plurality of sequential sub-steps for pulling up the pair of opposite side portions 4f, 4h by the first prescribed pulling stroke and the second peeling step also comprises a plurality of sequential sub-steps for pulling up the other pair of opposite side portions 4g, 4i by the second pulling stroke. In such a case, the first peeling step and the second peeling step are conducted alternately. Such specific peeling steps makes it possible to cause the peeling action to extend gradually from the periphery of the lens sheet 1 toward the central portion thereof, thus providing a smooth peeling operation of the lens sheet 1 from the forming mold 2.

In case where each of the first and second peeling steps comprises the plurality of sequential sub-steps as described above, the first and second prescribed pulling strokes may increase according as the numbers of the first and second sequential sub-steps increase. According to such a specific feature, the lens sheet 1 is gradually peeled from the forming mold 2. It is therefore possible to prevent an excessively large force from being applied to the lens sheet 1 when peeling the lens sheet, thus avoiding occurrence of defect or damage of the lens sheet 1.

Application of the peeling method as described above makes it possible to prevent the irregularities of the Fresnel lens formed of the ionizing radiation curing type resin 3 from being damaged by the forming mold 2.

The above-described peeling steps for the lens sheet may be carried out by a manual operation. These steps may however be carried out with the use of a peeling apparatus. The peeling apparatus preferably has a plurality of suction cups for sucking the four corners or sides of the lens sheet or a plurality of clamping members for clamping the four corners or sides of the lens sheet. These suction cups and clamping members serve in the same manner as the manual operation. The peeling apparatus is designed so that the above-mentioned steps are carried out appropriately. The step for pressing the central portion 4a of the lens sheet 1 against the forming mold 2 may be omitted, when the lens sheet 1 can be peeled fully and smoothly from the forming mold 2.

Figure 2A:
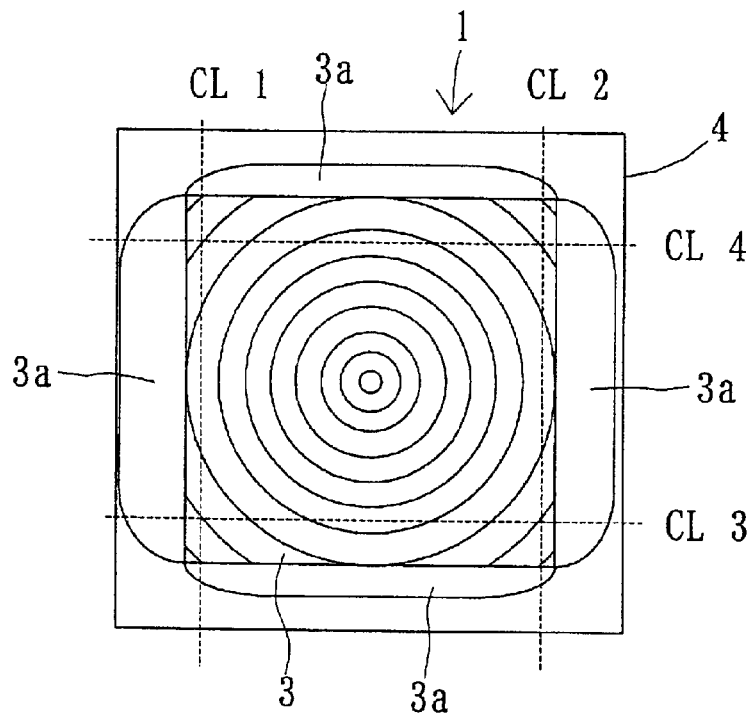
FIGS. 2(A) and 2(B) are plan views of a lens sheet manufactured by the lens sheet manufacturing method as shown in FIG. 1.
Figure 2B:
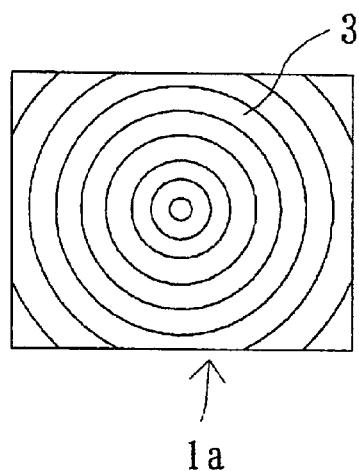

The Fresnel lens sheet 1 can be prepared by carrying out all of the steps (A) to (G). The substrate 4 of the Fresnel lens sheet 1 has a superfluous amount of ionizing radiation curing type resin 3, which has extended from the four sides of the forming mold 2 to adhere on the substrate 4 and been cured, as shown in FIG. 2(A). Cutting operations of useless end portions having a superfluous amount of ionizing radiation curing type resin 3 are applied, as an occasion demands, to the Fresnel lens sheet 1 along cutting lines CL1, CL2, CL3 and CL4 as shown in FIG. 2(A) to remove the useless end portions, thus obtaining the Fresnel lens sheet 1a as the finished product as shown in FIG. 2(B).

Now, description will be given below of an example of the apparatus for carrying out the above-described peeling method of the present invention.

Figure 7:
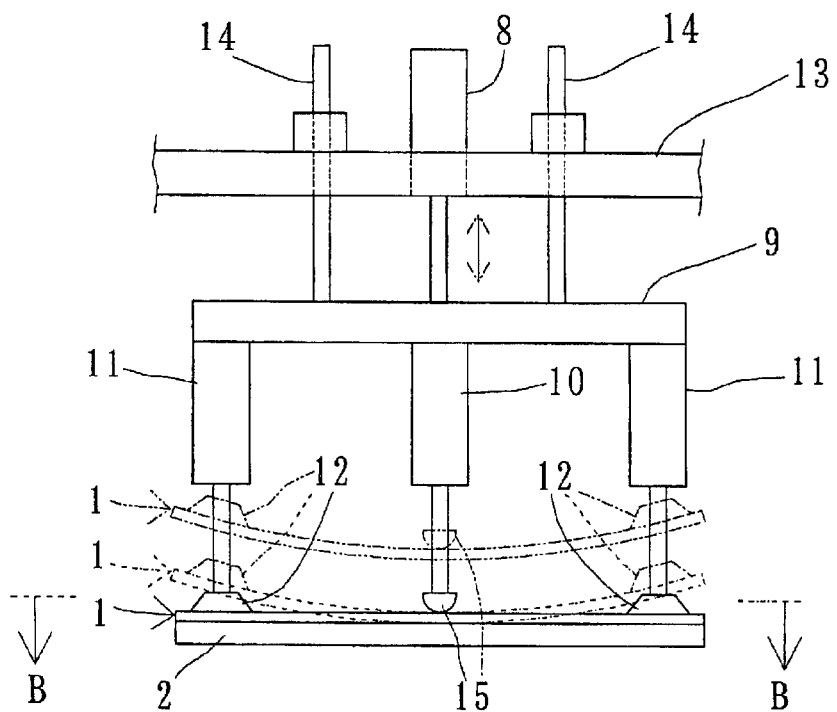
FIG. 7(A) is a front view illustrating an example of a lens sheet peeling apparatus.
FIG. 7(B) is a view of the apparatus, having a viewing direction based on the line B—B in FIG. 7(A)
Figure 7B:
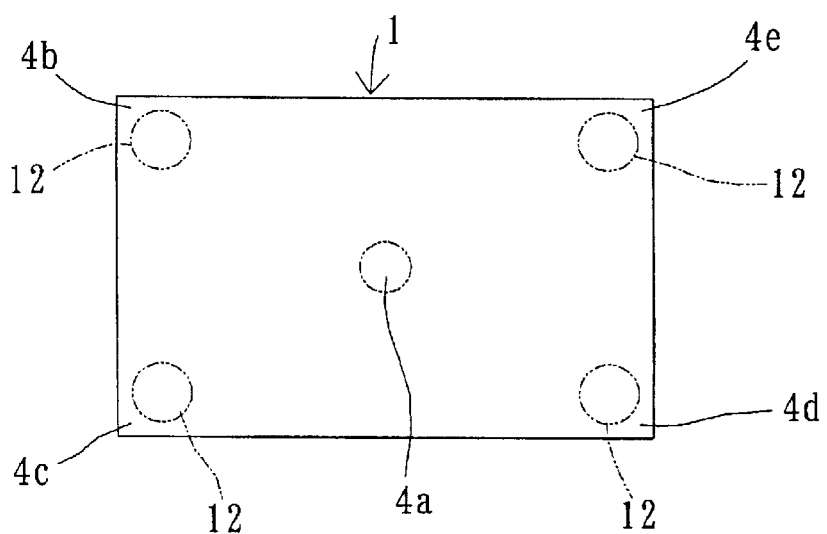

As shown in FIGS. 7(A) and 7(B), the lens sheet peeling apparatus of the present invention comprises a movable plate 9, a pressing device and the first and second lifting devices. The movable plate 9 can be moved up and down above the forming mold 2 by means of an actuator 8. The pressing device, which presses the central portion 4a of the lens sheet 1 formed on the forming mold 2 against it, is mounted on the movable plate 9 through an actuator 10. The first lifting device catches the pair of opposite portions of the lens sheet 1 and moves it up and down. The second lifting device catches the other pair of opposite portions of the lens sheet 1 and moves it up and down. The first and second lifting devices are mounted on the movable plate 9 through actuators 11, respectively.

The movable plate 9 is formed for example of a rectangular plate. The movable plate 9 is disposed horizontally below a frame 13 of the lens sheet peeling apparatus. The movable plate 9 is suspended by the air cylinder serving as the actuator 8 and guide rods 14 so as to be movable up and down.

The pressing device has an air cylinder serving as the actuator 10 mounted on the central portion of the lower surface of the movable plate 9, and a pressing member (protrusion) 15 secured to the lower end of a rod of the air cylinder. The pressing member 15 has on its lower side a curved portion so as to prevent the lend sheet from being damaged when the pressing member 15 comes into contact with the central portion 4a of the lens sheet 1.

The first lifting device comprises a pair of air cylinders 11, 11 serving as the actuators, which are fixed on the movable plate 9 so as to extend downward, and a pair of suction cups 12, 12 which are made of soft material such as rubber and secured to the lower ends of rods of the air cylinders 11, 11, respectively, so as to face downward. The first lifting device can therefore suck the pair of opposite diagonal edge portions 4b, 4d of the lens sheet 1 with the use of the suction cups 12, 12 and move them up and down. The second lifting device also comprises a pair of air cylinders 11, 11 serving as the actuators, which are fixed on the movable plate 9 so as to extend downward, and a pair of suction cups 12, 12, which are made of soft material such as rubber and secured to the lower ends of rods of the air cylinders 11, 11, respectively, so as to face downward. The second lifting device can therefore suck the other pair of opposite diagonal edge portions 4c, 4e of the lens sheet 1 with the use of the suction cups 12, 12 and move them up and down. In the embodiment, the four air cylinders 11, 11, 11, 11 and the four suction cups 12, 12, 12, 12 of the first and second lifting devices are disposed on the four corners of the movable plate 9 so that the suction cups 12 can suck the four diagonal edge portions 4b, 4c, 4d, 4e. In case where two pairs of opposite side portions 4f, 4g, 4h, 4i of the lens sheet 1 are sucked (see FIG. 6), the four air cylinders 11, 11, 11, 11 and the four suction cups 12, 12, 12, 12 of the first and second lifting devices are however disposed on the four sides of the movable plate 9. Clamping members for catching the lens sheet 1 with their clamping pieces may be used in place of the suction cups 12, 12, 12, and 12.

A control device for controlling the air cylinders serving as the actuators 8, 10, and 11 is composed for example as a programmable controller.

With respect to the operations for peeling the lens sheet 1 from the forming mold 2, the lens sheet peeling apparatus of the present invention operates as follows.

First, the pressing member 15 serving as the pressing device descends as shown in solid lines in FIG. 7(A) to press the central portion 4a of the lens sheet 1 formed on the forming mold 2 against the forming mold 2. The suction cups 12, 12, 12, 12 also descend to suck the two pairs of diagonal edge portions 4f, 4g, 4h, 4i of the lens sheet 1 formed on the forming mold 2.

Then, the two suction cups 12, 12 of the first lifting device, which suck the pair of opposite diagonal edge portions 4b, 4d of the lens sheet 1, ascend simultaneously to peel partially the lens sheet 1 from the forming mold 2. The above-mentioned two suction cups 12, 12 may ascend at a different time.

The two suction cups 12, 12 of the second lifting device, which suck the other pair of opposite diagonal edge portions 4c, 4e of the lens sheet 1, ascend simultaneously to peel partially the lens sheet 1 from the forming mold 2 as shown in one-dot chain lines in FIG. 7(A), at the same time when the above-mentioned two suction cups 12, 12 of the first lifting device ascend. The above-mentioned two suction cups 12, 12 may ascend at a different time. In addition, the operation for moving up the two suction cups 12, 12 of the second lifting device (i.e., the first peeling step) and the operation for moving up the two suction cups 12, 12 of the first lifting device (i.e., the second peeling step) may be carried out at a different time. The above-mentioned first peeling step may comprise a plurality of first sequential sub-steps for pulling up the pair of opposite portions 4b, 4d by the first prescribed pulling stroke, and the above-mentioned second peeling step may also comprise a plurality of second sequential sub-steps for pulling up the other pair of opposite portions 4c, 4e by the second prescribed pulling stroke. In such a case, the first prescribed pulling stroke may increase according as the number of the first sequential sub-steps increases and the second prescribed pulling stroke may increase according as the number of the second sequential sub-steps increases. The first prescribed pulling stroke may be equal to the second pulling stroke. Such a specific peeling operation is much effective when the lens sheet has a large size or adhesiveness of the ionizing radiation curing type resin onto the forming mold is relatively strong.

Then, the movable plate 9 ascends as shown in two-dot chain lines in FIG. 7(A) to lift up the lens sheet 1 above the forming mold 2, thus peeling entirely the lens sheet 1. The peripheral portions of the lens sheet 1 are first peeled and the central portion 4a thereof is finally peeled in this manner. It is possible to peel smoothly the lens sheet 1 from the forming mold 2, while preventing the lens sheet 1 from being damaged by the lens formation grooves of the forming mold 2.

In case where the lens sheet 1 can be peeled fully and smoothly from the forming mold 2, there may be omitted the pressing device such as the pressing member 15 for pressing the central portion 4a of the lens sheet 1 against the forming mold 2.

<Second Embodiment>

Figure 9:
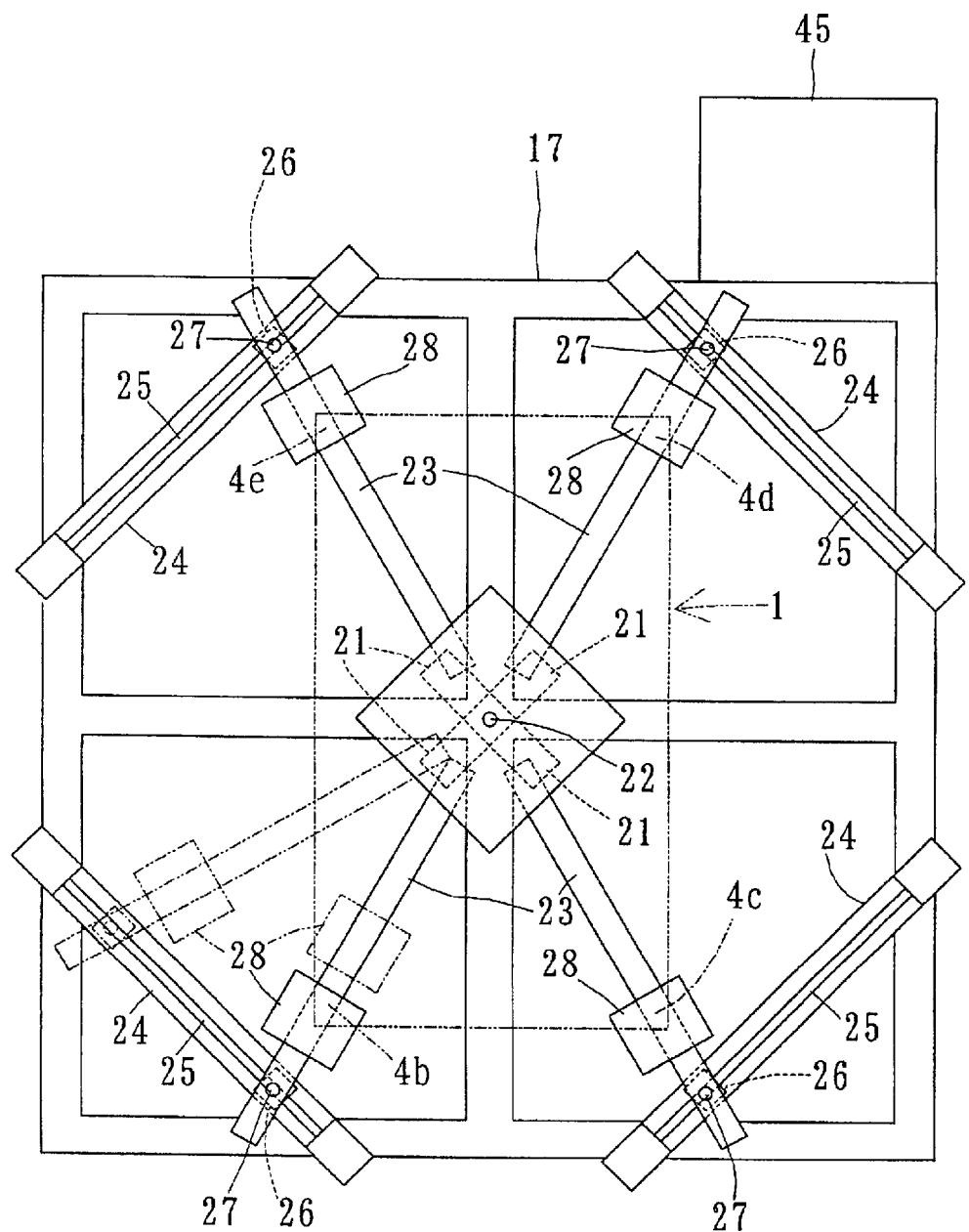
FIG. 9 is a plan view illustrating another embodiment of the lens sheet peeling apparatus of the present invention.
Figure 10:
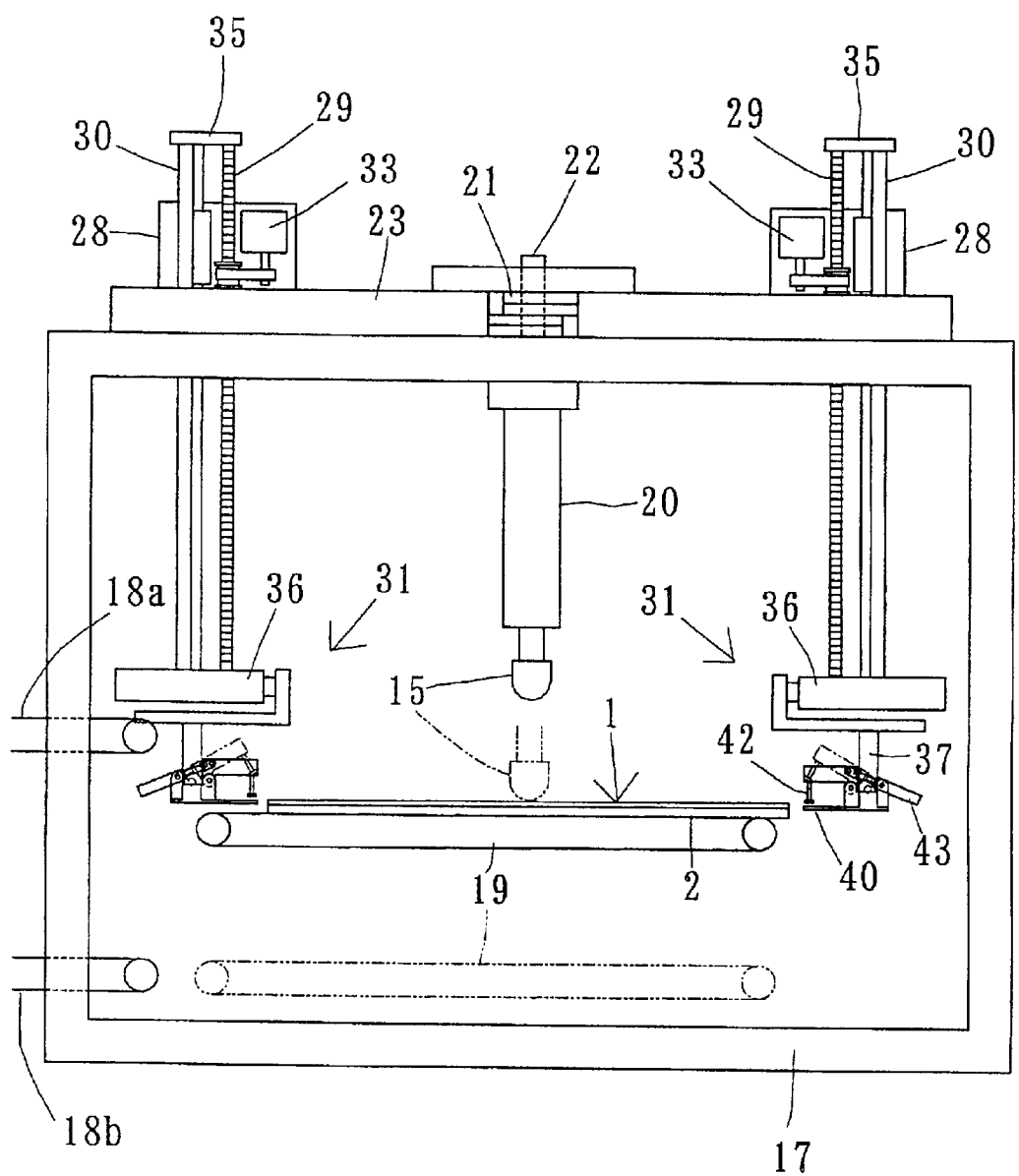
FIG. 10 is a front view illustrating the lens sheet peeling apparatus of the present invention as shown in FIG. 9.

The lens sheet peeling apparatus of the second embodiment of the present invention has a frame 17, which is formed into a cubic shaped assembly, as shown in FIGS. 9 and 10. Upper and lower conveyors 18a, 18b are connected to the frame 17. The upper conveyor 18a conveys the forming mold 2 on which the lens sheet 1 has been formed, into the frame 17. The lower conveyor 18b conveys the forming mold 2 from which the lens sheet 1 has been removed, outside the frame 17. An elevating device 19, which also serves as the conveyor, is provided in the frame 17 so as to move up and down between the upper and lower conveyors 18a, 18b. As a result, the elevating device 19 receives the forming mold 2 on which the lens sheet 1 has been formed, from the upper conveyor 18a, and delivers the forming mold 2 from which the lens sheet 1 has been removed, to the lower conveyor 18b.

The pressing device for pressing the central portion 4a (see FIGS. 5 and 6) of the lens sheet, which has been formed on the forming mold 2, against the forming mold 2, is provided on the central portion of the ceiling of the frame 17. The pressing device includes an air cylinder 20 serving as the actuator, which extends from the ceiling of the frame 17, and a pressing member (protrusion) 15 secured to the lower end of a rod of the air cylinder 20. The pressing member 15 has on its lower side a curved portion so as to prevent the lend sheet from being damaged when the pressing member 15 comes into contact with the central portion 4a of the lens sheet 1. The pressing device, which is provided, as an occasion demands, may be omitted in case where the lens sheet 1 can smoothly be peeled from the periphery of the lens sheet 1 toward the central portion thereof.

The first and second lifting devices are provided on the frame 17 so that four lifting units including four ball screws for the above-mentioned first and second lifting devices are placed on the four corners of the ceiling of the frame 17. These first and second lifting devices catch the pair of opposite diagonal edge portions 4b, 4d and the other pair of opposite diagonal edge portions 4d, 4e (see FIG. 5) of the lens sheet 1 and move them up and down. The first and second lifting devices may be provided so as to catch the two pairs of opposite side portions 4f, 4g, 4h, 4i (see FIG. 6).

The first and second lifting devices are supported on the ceiling of the frame 17 so as to be movable horizontally. More specifically, four horizontally swingable pieces 21, 21, 21, 21 are pivoted swingably on the center of the ceiling of the frame 17 by means of a pin 22. Four arms 23, 23, 23, 23 are fixed to the front ends of the horizontally swingable pieces 21, 21, 21, 21, respectively, so as to extend toward the corners of the frame 17. The arms 23, 23, 23, 23 are supported on four beams 24, 24, 24, 24, respectively, so as to cross the above-mentioned beams, which bridge the four corner of the frame 17. A ball screw 25, a ball nut 26 and a not-shown motor for rotating the ball screw 25 are mounted on each of the beams 24, 24, 24, and 24. The arm 23 is connected to the ball nut 26 by means of a pin 27. Rotation of the ball screw 25 due to drive of the motor causes the ball nut 26 to move on the ball screw 25. As a result, the arm 23 swings around the pin 22, which is provided at the center of the ceiling of the frame 17. Four clamping members 31, 31, 31, 31 described later of the first and second lifting devices are provided on the above-mentioned arms 23, 23, 23, 23, respectively. The clamping members 31, 31, 31, 31 are swingable around the pin 22, which is provide at the center of the ceiling of the frame 17, so to change positions of the clamping members in accordance with aspect ratio (i.e., the ratio of the longitudinal length to the transverse length) of the lens sheet 1 to be manufactured. In addition, the position of the clamping member can be changed through a sliding motion on the arm 23, in accordance with the size of the lens sheet 1.

Figure 11:
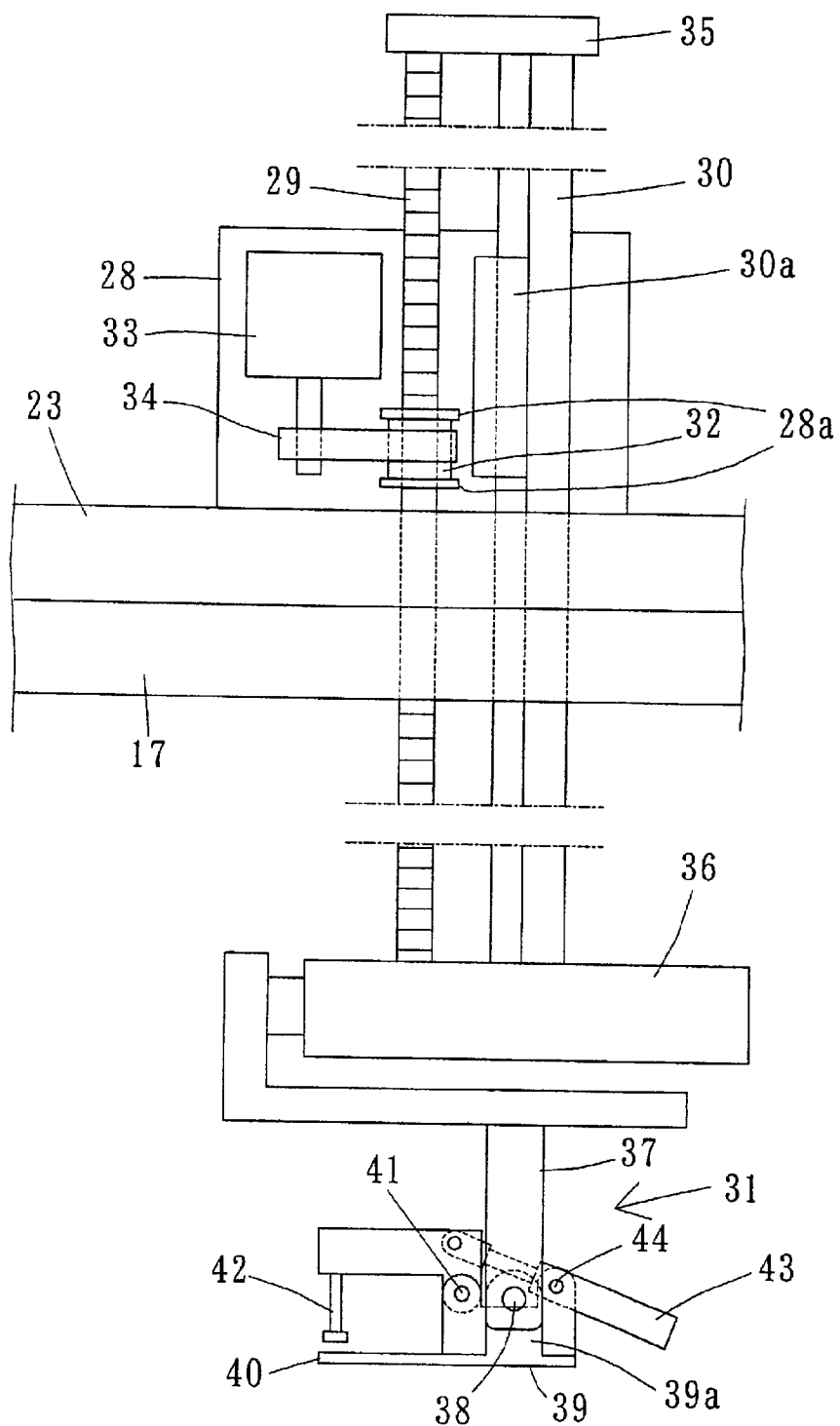
FIG. 11 is an enlarged partial front view illustrating the lens sheet peeling apparatus of the present invention as shown in FIG. 10.

Each of the four lifting units of the first and second lifting devices includes a box 28 supported on the above-mentioned arm 23; a ball screw 29 and a guide rod 30, which pass through the box 28; and the clamping member 31 provided on the lower ends of the ball screw 29 and the guide rod 30, as shown in FIG. 11. The position of the box 28 relative to the arm 23 is adjustable. The box 28 is stationarily held on the arm 23, after completion of an appropriate positional adjustment of the box 28 in accordance with the size of the lens sheet 1. A ball nut 32 engages with the ball screw 29. The ball nut 32 is rotatably supported on the box 28 through a bracket 28a. A gear motor 33 is fixed in the box 28. A power transmission device, which includes a belt 34 and a pulley, connects dynamically an output shaft of the gear motor 33 to the ball nut 32. A guide plate 30a, which is fixed to the box 28, is slidably fitted to the guide rod 30. The ball screw 29 and the guide rod 30 are connected at their upper ends by a connecting plate 35 and at their lower ends by an air cylinder 36 serving as an actuator, which supports the clamping member 31. The ball screw 29 is rotatable relative to the connecting plate 35 and the air cylinder 36. Drive of the gear motor 33 causes the ball nut 32 to rotate in the box 28 so that the ball screw 29 moves up and down together with the guide rod 30. Accordingly, the clamping member 31 can move to a position of the lens sheet 1 formed on the forming mold 2, which is placed on the elevating device 19.

Figure 12:
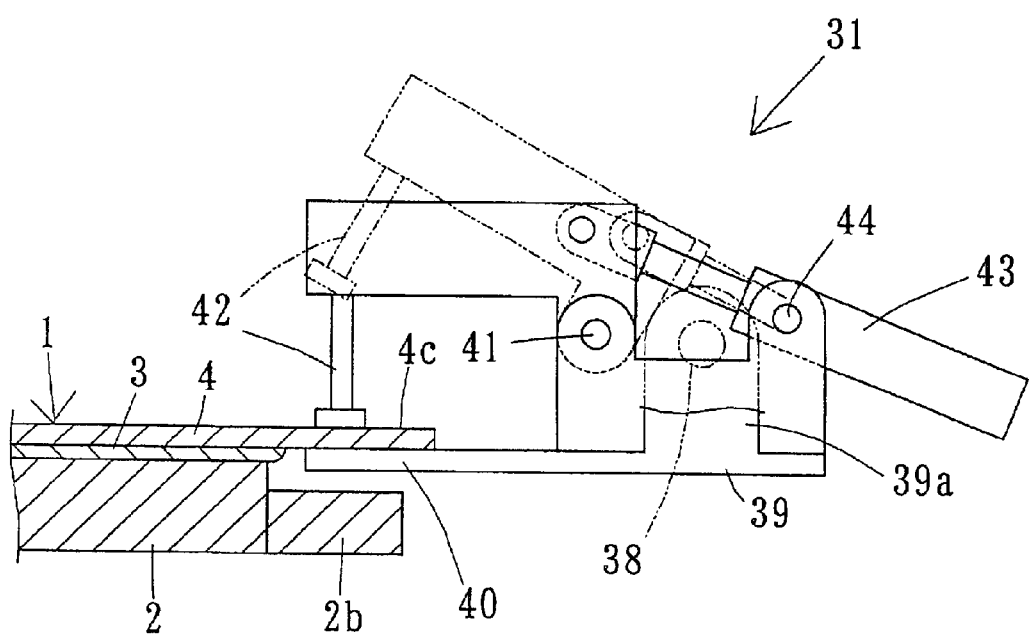
FIG. 12 is a front view of a clamping member.

Each of the clamping members 31 includes the air cylinder 36, a hanging arm 37, a clamp body 39, a lower clamping piece 40, an upper clamping piece 42 and an air cylinder 43, as shown in FIGS. 11 and 12. The air cylinder 36 is fixed to the lower ends of the ball screw 29 and the guide rod 30. The hanging arm 37 is connected to a rod of the air cylinder 36. The clamp body 39 is swingably connected to the hanging arm 37 by means of a pin 38. The lower clamping piece 40 is provided on the clam body 39. The upper clamping piece 42 is swingably connected to the clamp body 39 by means of a pin 41. The air cylinder 43 serves as an actuator for moving the upper clamping piece 42 toward or away from the lower clamping piece 40.

The air cylinder 36 fixed to the lower end of the ball screw 29 is supported horizontally by means of the arm 23, which is mounted on the above-mentioned frame 17 so that the rod of the air cylinder 36 moves the clamp body 39 toward or away from the diagonal edge portion 4b, 4c, 4d, 4e of the lens sheet 1 formed on the forming mold 2, which is placed on the elevating device 19.

Figure 13A:
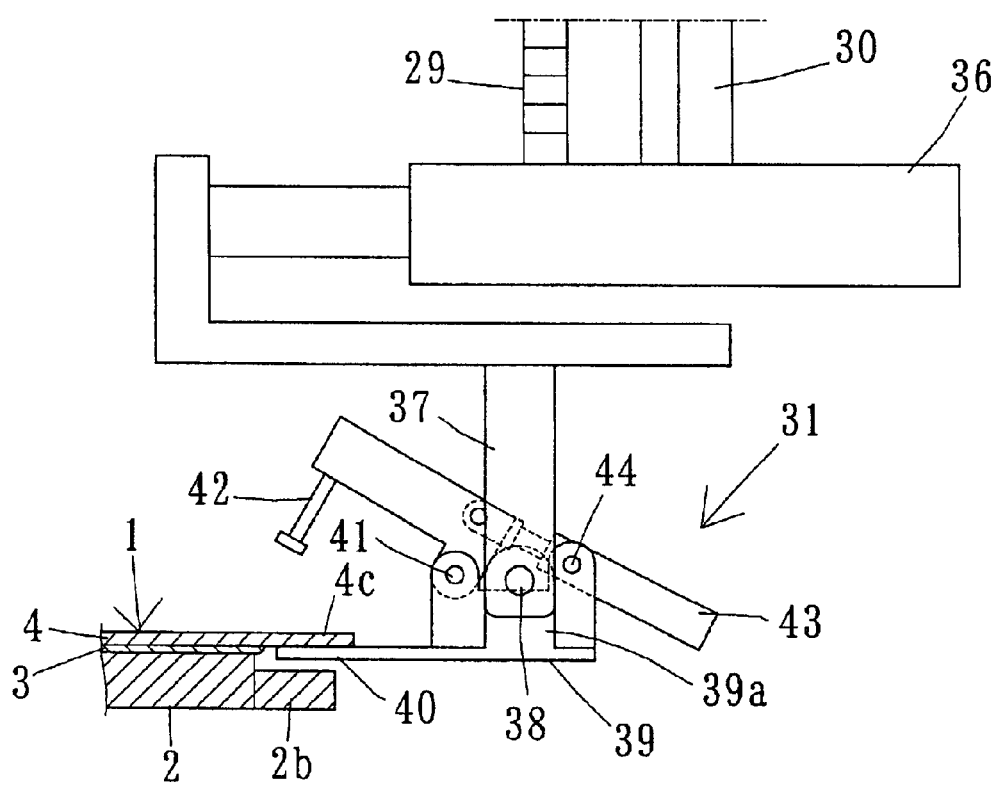
FIGS. 13(A) to 13(C) are views illustrating operation of the clamping member.
Figure 13B:
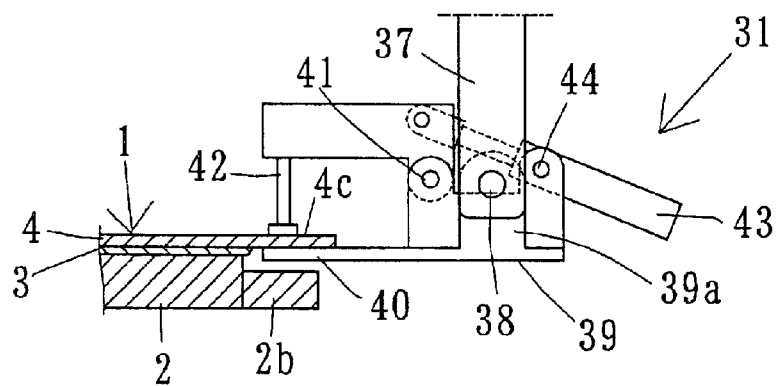
Figure 13C:
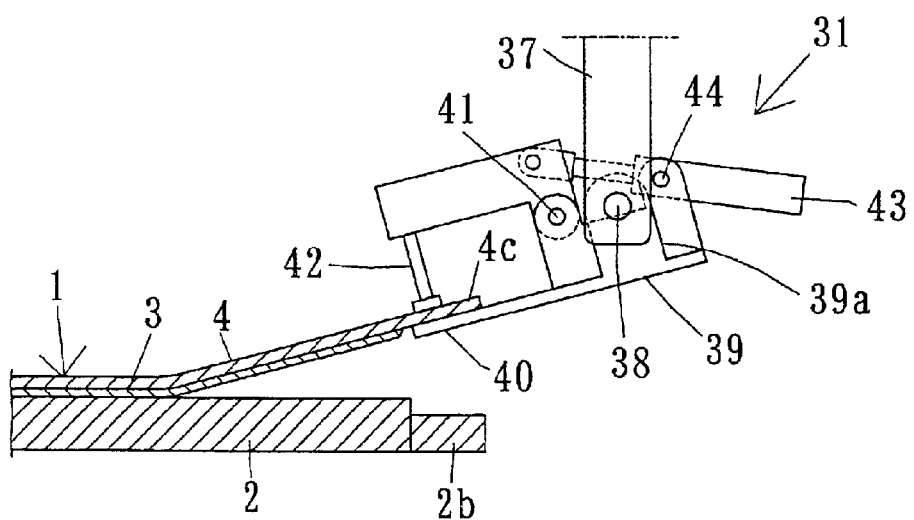

The clamp body 39 is connected to the hanging arm 37 by means of the pin 38 so as to be swingable along the vertical plane as shown in FIG. 13(C). The clamp body 39 takes its horizontal posture as shown in FIG. 12, when the lifting operation of the lens sheet 1 is not carried out. The lower clamping piece 40 is formed of a plate, which extends horizontally from the clam body 39. The upper clamping piece 42, which catches the diagonal edge portion 4b, 4c, 4d, 4e of the lens sheet 1 in cooperation with the lower clamping piece 40, is swingable along the vertical plane relative to the lower clamping piece 40.

The air cylinder 43, which swings the upper clamping piece 42 up and down, is connected swingably to a bracket 39a, which is formed integrally with the clamp body 39, by means of a pin 44. The operation of the air cylinder 43 causes the upper clamping piece 42 to swing between the position shown in the two-dot chain lines and the position shown in the solid lines in FIG. 12 so as to catch the diagonal edge portion 4b, 4c, 4d, 4e of the lens sheet 1 in cooperation with the lower clamping piece 40 or release it. In place of the clamping pieces 40, 42 and the relevant components, suction cups may be provided on the clamp body 39.

The above-mentioned gear motor 33, and the air cylinders 20, 36, 43 are controlled by means of a control device 45.

With respect to the operations for peeling the lens sheet 1 from the forming mold 2, the lens sheet peeling apparatus of the present invention operates as follows.

When the lens sheet 1 formed on the forming mold 2 is conveyed on the elevating device 19 by means of the upper conveyor 18a, as shown in FIG. 10, the pressing member 15 serving as the pressing device descends under the function of the air cylinder 20 to press the central portion 4a of the lens sheet 1 formed on the forming mold 2 against the forming mold 2.

Then, the air cylinders 36, 36, 36, 36 operate to move the clamping members 31, 31, 31, 31 toward the diagonal edge portions 4b, 4c, 4d, 4e of the lens sheet 1, respectively, as shown in FIG. 13(A). Each of the lower clamping pieces 40, 40, 40, 40 is placed on the lower surface of the substrate 4 of the lens sheet 1. A superfluous amount of ionizing radiation curing type resin 3 formed on the corner portions of the lens sheet 1 is so small. It is therefore easy to place the lower clamping piece 40 on the lower surface of the substrate 4 of the lens sheet 1.

After each of the lower clamping pieces 40, 40, 40, 40 is placed on the lower surface of the substrate 4 of the lens sheet 1, the air cylinder 43 operates to move each of the upper clamping pieces 42, 42, 42, 42 down as shown in FIG. 13(B). As a result, the upper and lower clamping pieces 40, 40, 40, 40 and 42, 42, 42, 42 catch the diagonal edge portions 4b, 4c, 4d, 4e of the lens sheet 1, respectively.

After the upper and lower clamping pieces 40, 40, 40, 40 and 42, 42, 42, 42 catch the diagonal edge portions 4b, 4c, 4d, 4e of the lens sheet 1, respectively, the motor 33 in the box 28 operates to move the ball screw 29 and the guide rod 30 up. Accordingly, the clamping member 31 ascends as shown in FIG. 13(C) so as to peel the diagonal edge portion 4b, 4c, 4d, 4e of the lens sheet 1 toward the central portion thereof from the forming mold 2. The clamp body 39 swings around the pin 38 to incline downward, in accordance with an inclination angle of the diagonal edge portion 4b, 4c, 4d, 4e of the lens sheet 1, so as to prevent the lens sheet 1 from bending at an acute angle.

The order of catching the diagonal edge portions 4b, 4c, 4d, 4e of the lens sheet 1 by the four clamping members 31, 31, 31, 31 and the order of moving up them are previously determined on the basis of a program. The program is previously determined in accordance with the peeling operations described in the first embodiment of the present invention. The four clamping members 31, 31, 31, 31 operate to pull up the pair of opposite diagonal edge portions 4b, 4d simultaneously or at a different time to peel partially the lens sheet 1 from the forming mold 2, and then or at the same time, to pull up the other opposite diagonal edge portions 4c, 4e simultaneously or at a different time to peel partially the lens sheet 1 from the forming mold 2, and finally to pull up further the two pairs of opposite diagonal edge portions 4b, 4d, 4c, 4e. The pressing member (protrusion) 15 of the pressing device also moves up when the above-mentioned final lifting operation of the lens sheet 1 is carried out.

The lens sheet 1 is peeled from the forming mold 2 in this manner. Then, the elevating device 19 descends to convey the forming mold 2 from which the lens sheet 1 has been peeled, to the lower conveyor 18b. Then, the elevating device 19 ascends again to receive the lens sheet 1 thus peeled, from the clamping members 31, 31, 31, 31. The air cylinders 43, 43, 43, 43 operate inversely to open the upper clamping pieces 42, 42, 42, 42 as shown in FIG. 13(A). After the clamping members 31, 31, 31, 31 release the lens sheet 1 on the elevating device 19, they move away from the lens sheet 1 under the inverse operation of the air cylinders 36, 36, 36, 36, thus providing a stand-by state for the next forming mold 2 on which a new lens sheet has been formed.

In case where the box 28 is moved actively in a manner as described above, the position of the clamping member 31 can be changed by the positional adjustment of the position of the box 28 on the arm 23. In such a case, the air cylinder 36 may be used as a shock absorber or omitted. In place of the air cylinder 43, there may be provided a magnetic device for carrying out a clamping operation of the clamping pieces 42.

In the first aspect of the present invention as described in detail, the method of the first aspect of the present invention for peeling a lens sheet having two pairs of opposite portions from a forming mold, comprises: a first peeling step for pulling up a pair of opposite portions of a lens sheet, which is formed on a forming mold, to peel partially said lens sheet from said forming mold; a second peeling step for pulling up an other pair of opposite portions of said lens sheet to peel partially said lens sheet from said forming mold; and a third peeling step for pulling up further said two pairs of opposite portions to peel entirely said lens sheet from said forming mold.

In the second aspect of the present invention, said first peeling step and said second peeling step may be conducted simultaneously.

In the third aspect of the present invention, said first peeling step and said second peeling step may be conducted at a different time.

In the fourth aspect of the present invention, said first peeling step may be conducted by pulling up said pair of opposite portions simultaneously; and said second peeling step may be conducted by pulling up said other pair of opposite portions simultaneously.

In the fifth aspect of the present invention, said first peeling step may be conducted by pulling up said pair of opposite portions simultaneously; and said second peeling step may be conducted by pulling up said other pair of opposite portions at a different time.

In the sixth aspect of the present invention, said first peeling step may be conducted by pulling up said pair of opposite portions at a different time; and said second peeling step may be conducted by pulling up said other pair of opposite portions simultaneously.

In the seventh aspect of the present invention, said first peeling step may be conducted by pulling up said pair of opposite portions at a different time; and said second peeling step may be conducted by pulling up said other pair of opposite portions at a different time.

According to the above-mentioned features of the first to seventh aspects of the present invention, it is possible to peel smoothly the lens sheet from the forming mold, while preventing irregularities formed on the lens sheet from being coming into frictional contact with or being caught by irregularities of lens formation grooves of the forming mold. Defects or damage of the lens sheet can be prevented.

In the eighth aspect of the present invention, the method thereof may further comprise a holding step for holding a central portion of said lens sheet on said forming mold, prior to said first peeling step. According to such a feature, it is possible to peel the lens sheet from its periphery toward its central portion, thus preventing the peeling action starting from a certain peripheral position from extending through the central portion of the lens sheet to the opposite side. As a result, it is possible to reliably prevent the irregularities formed on the lens sheet from being coming into frictional contact with or being caught by the irregularities of the lens formation grooves of the forming mold.

In the ninth aspect of the present invention, said pair of opposite portions may be a pair of opposite diagonal edge portions of said lens sheet and said other pair of opposite portions may be the other pair of opposite diagonal edge portions thereof. According to such features, it is possible to catch the lens sheet to pull it up, thus performing an easy peeling operation of the lens sheet.

In the tenth aspect of the present invention, said pair of opposite portions may be a pair of opposite side portions of said lens sheet and said other pair of opposite portions may be the other pair of opposite side portions thereof. According to such features, it is possible to prevent deformation of the lens sheet when peeling it from the forming mold.

In the eleventh aspect of the present invention, said first peeling step may comprise a plurality of first sequential sub-steps for pulling up said pair of opposite portions by a first prescribed pulling stroke; said second peeling step may comprise a plurality of second sequential sub-steps for pulling up said other pair of opposite portions by a second prescribed pulling stroke; and said first peeling step and said second peeling step may be conducted alternately. According to such features, it is possible to peel the lens sheet from the forming mold in an appropriate manner even when the lens sheet has a large size.

In the twelfth aspect of the present invention, said first prescribed pulling stroke may increase according as number of said first sequential sub-steps increases; and said second prescribed pulling stroke may increase according as number of said second sequential sub-steps increases. According to such features, the lens sheet is peeled gradually from the forming mold. It is therefore possible to prevent an excessively large force from being applied to the lens sheet when peeling the lens sheet, thus avoiding occurrence of defect or damage of the lens sheet.

The apparatus of the thirteenth aspect of the present invention for peeling a lens sheet having two pairs of opposite portions from a forming mold, comprises: a first lifting device for pulling up a pair of opposite portions of a lens sheet, which is to be formed on a forming mold; a second lifting device for pulling up an other pair of opposite portions of said lens sheet; and a control device for controlling said first and second lifting devices on a basis of any one of (i) a first operation mode that the pulling up of said pair of opposite portions of said lens sheet by said first lifting device and the pulling up of said other pair of opposite portions thereof by said second lifting device are conducted simultaneously to peel partially said lens sheet from said forming mold, and then both of said pair of opposite portions of said lens sheet and said other pair of opposite portions thereof are further pulled up by means of said first and second lifting devices to peel entirely said lens sheet from said forming mold, and (ii) a second operation mode that the pulling up of said pair of opposite portions of said lens sheet by said first lifting device and the pulling up of said other pair of opposite portions thereof by said second lifting device are conducted at a different time to peel partially said lens sheet from said forming mold, and then both of said pair of opposite portions of said lens sheet and said other pair of opposite portions thereof are further pulled up by means of said first and second lifting devices to peel entirely said lens sheet from said forming mold. According to the above-mentioned features of the thirteenth aspect of the present invention, it is possible to peel automatically the lens sheet from the forming mold, while preventing occurrence of defects or damage of the lens sheet.

In the fourteenth aspect of the present invention, the apparatus may further comprise a holding device for holding a central portion of said lens sheet on said forming mold. According to such a feature, the holding device holds the central portion of the lens sheet on the forming mold. It is therefore possible to peel the lens sheet from its periphery toward its central portion, thus preventing the peeling action starting from a certain peripheral position from extending through the central portion of the lens sheet to the opposite side. As a result, it is possible to reliably prevent the irregularities formed on the lens sheet from being coming into frictional contact with or being caught by the irregularities of the lens formation grooves of the forming mold.

In the fifteenth aspect of the present invention, said first and second lifting devices may comprise a plurality of suction cups. According to such a feature, it is possible to catch the lens sheet to pull it up without causing occurrence of defects or damage of the lens sheet.

In the sixteenth aspect of the present invention, said first and second lifting devices may comprise a plurality of clamping members. According to such a feature, it is possible to catch firmly the lens sheet to pull it up.

In the seventeenth aspect of the present invention, said control device may control said first and second lifting devices so that a plurality of first sequential sub-steps for pulling up said pair of opposite portions by a first prescribed pulling stroke are conducted by said first lifting device, a plurality of second sequential sub-steps for pulling up said other pair of opposite portions by a second prescribed pulling stroke are conducted by said second lifting device, and said plurality of first sequential sub-steps and said plurality of second sequential sub-steps are conducted alternately. According to such features, it is possible to peel the lens sheet from the forming mold in an appropriate manner even when the lens sheet has a large size.

In the eighteenth aspect of the present invention, said control device may control said first and second lifting devices so that said first prescribed pulling stroke increases according as number of said first sequential sub-steps increases; and said second prescribed pulling stroke increases according as number of said second sequential sub-steps increases. According to such features, the lens sheet is peeled gradually from the forming mold. It is therefore possible to prevent an excessively large force from being applied to the lens when peeling the lens sheet, thus avoiding occurrence of defect or damage of the lens sheet.

The entire disclosure of Japanese Patent Application No. 2000-373810 filed on Dec. 8, 2000 including the specification, claims, drawings and summary is incorporated herein by reference in its entirety.

What is claimed is:

1. A method for peeling a lens sheet having two pairs of opposite portions from a forming mold, comprising:
   a first peeling step for pulling up a pair of opposite portions of a lens sheet, which is formed on a forming mold, to peel partially said lens sheet from said forming mold;
   a second peeling step for pulling up an other pair of opposite portions of said lens sheet to peel partially said lens sheet from said forming mold; and
   a third peeling step for pulling up further said two pairs of opposite portions to peel entirely said lens sheet from said forming mold.

2. The method as claimed in claim 1, wherein:
   said first peeling step and said second peeling step are conducted simultaneously.

3. The method as claimed in claim 1, wherein:
   said first peeling step and said second peeling step are conducted at a different time.

4. The method as claimed in claim 2 or 3, wherein:
   said first peeling step is conducted by pulling up said pair of opposite portions simultaneously; and
   said second peeling step is conducted by pulling up said other pair of opposite portions simultaneously.

5. The method as claimed in claim 2 or 3, wherein:
   said first peeling step is conducted by pulling up said pair of opposite portions simultaneously; and
   said second peeling step is conducted by pulling up said other pair of opposite portions at a different time.

6. The method as claimed in claim 2 or 3, wherein:
   said first peeling step is conducted by pulling up said pair of opposite portions at a different time; and
   said second peeling step is conducted by pulling up said other pair of opposite portions simultaneously.

7. The method as claimed in claim 2 or 3, wherein:
   said first peeling step is conducted by pulling up said pair of opposite portions at a different time; and
   said second peeling step is conducted by pulling up said other pair of opposite portions at a different time.

8. The method as claimed in claim 1, further comprising:
   a pressing step for pressing a central portion of said lens sheet against said forming mold, prior to said first peeling step.

9. The method as claimed in claim 2 or 3, further comprising:
   a pressing step for pressing a central portion of said lens sheet against said forming mold, prior to said first peeling step.

10. The method as claimed in claim 4, further comprising:

a pressing step for pressing a central portion of said lens sheet against said forming mold, prior to said first peeling step.

11. The method as claimed in claim 5, further comprising:

a pressing step for pressing a central portion of said lens sheet against said forming mold, prior to said first peeling step.

12. The method as claimed in claim 6, further comprising:

a pressing step for pressing a central portion of said lens sheet against said forming mold, prior to said first peeling step.

13. The method as claimed in claim 7, further comprising:

a pressing step for pressing a central portion of said lens sheet against said forming mold, prior to said first peeling step.

14. The method as claimed in claim 1, wherein:

said pair of opposite portions are a pair of opposite diagonal edge portions of said lens sheet and said other pair of opposite portions are an other pair of opposite diagonal edge portions thereof.

15. The method as claimed in claim 8, wherein:

said pair of opposite portions are a pair of opposite diagonal edge portions of said lens sheet and said other pair of opposite portions are an other pair of opposite diagonal edge portions thereof.

16. The method as claimed in claim 1, wherein:

said pair of opposite portions are a pair of opposite side portions of said lens sheet and said other pair of opposite portions are an other pair of opposite side portions thereof.

17. The method as claimed in claim 8, wherein:

said pair of opposite portions are a pair of opposite side portions of said lens sheet and said other pair of opposite portions are an other pair of opposite side portions thereof.

18. The method as claimed in claim 1, wherein:

said first peeling step comprises a plurality of first sequential sub-steps for pulling up said pair of opposite portions by a first prescribed pulling stroke;

said second peeling step comprises a plurality of second sequential sub-steps for pulling up said other pair of opposite portions by a second prescribed pulling stroke; and said first peeling step and said second peeling step are conducted alternately.

19. The method as claimed in claim 8, wherein:

said first peeling step comprises a plurality of first sequential sub-steps for pulling up said pair of opposite portions by a first prescribed pulling stroke;

said second peeling step comprises a plurality of second sequential sub-steps for pulling up said other pair of opposite portions by a second prescribed pulling stroke; and said first peeling step and said second peeling step are conducted alternately.

20. The method as claimed in claim 18, wherein:

said first prescribed pulling stroke increases according as number of said first sequential sub-steps increases; and said second prescribed pulling stroke increases according as number of said second sequential sub-steps increases.

21. The method as claimed in claim 19, wherein:

said first prescribed pulling stroke increases according as number of said first sequential sub-steps increases; and said second prescribed pulling stroke increases according as number of said second sequential sub-steps increases.

* * * * *